Jan. 13, 1970 — H. WAGNER ET AL — 3,490,062
STEERING PISTON, ESPECIALLY HYDRAULIC
PISTON, WITH STEERING GEAR NUT
Filed Feb. 13, 1967 — 2 Sheets-Sheet 1

INVENTORS
HEINRICH WAGNER
ERICH JABLONSKY

BY *Albert W. Jalkind*

ATTORNEY

Jan. 13, 1970    H. WAGNER ET AL    3,490,062
STEERING PISTON, ESPECIALLY HYDRAULIC
PISTON, WITH STEERING GEAR NUT

Filed Feb. 13, 1967

INVENTORS
HEINRICH WAGNER
ERICH JABLONSKY

United States Patent Office 3,490,062
Patented Jan. 13, 1970

3,490,062
STEERING PISTON, ESPECIALLY HYDRAULIC PISTON, WITH STEERING GEAR NUT
Heinrich Wagner and Erich Jablonsky, Schwabisch Gmund, Germany, assignors to Zahnradfabrik Friedrichshafen Aktiengesellschaft, Friedrichshafen am Bodensee, Germany
Filed Feb. 13, 1967, Ser. No. 615,620
Claims priority, application Germany, Feb. 17, 1966, Z 12,037
Int. Cl. F16b 9/00; F16c 3/10; F16d 1/06
U.S. Cl. 287—20                     6 Claims

ABSTRACT OF THE DISCLOSURE

This invention relates to a construction of a booster piston used in power steering and a steering nut which is carried by the piston and which co-acts with the screw at the end of the steering spindle. More particularly, the invention is directed to the mechanical connection between the piston and the nut.

Field of the invention

The invention relates to the power steering field.

Description of the prior art

Prior art constructions of nut and piston combinations sometimes cause misalignments between these two elements and sometimes separation between these two elements is caused by axial and torsional loads transmitted therebetween. Such prior art constructions have generally required the use of large pistons and nuts in order to insure suitably strong connection and such enlarged members are undesirable in high pressure systems. Further, some prior art constructions have required the use of radial bolts between the steering nut and the piston which in turn necessitates an excessively thick wall for the piston.

Summary of the invention

The present invention eliminates disadvantages of the prior art by providing a connection between the steering nut and the piston wherein the piston has an axial bore into which a portion, at least, of the nut fits, thereby axially aligning the nut and the piston, at the end of the piston. Various fastening means are utilized for securing the nut to the piston after it has been thus aligned by at least partial insertion in the end thereof. Such securing means is simple and assembly of the nut and piston can readily be accomplished by mass production methods. The mode of securement provides a strong connection for resisting axial and torsional stresses and for avoiding distortion between the piston and the nut as will be apparent from the description to follow.

Description of the invention

Figure 1:
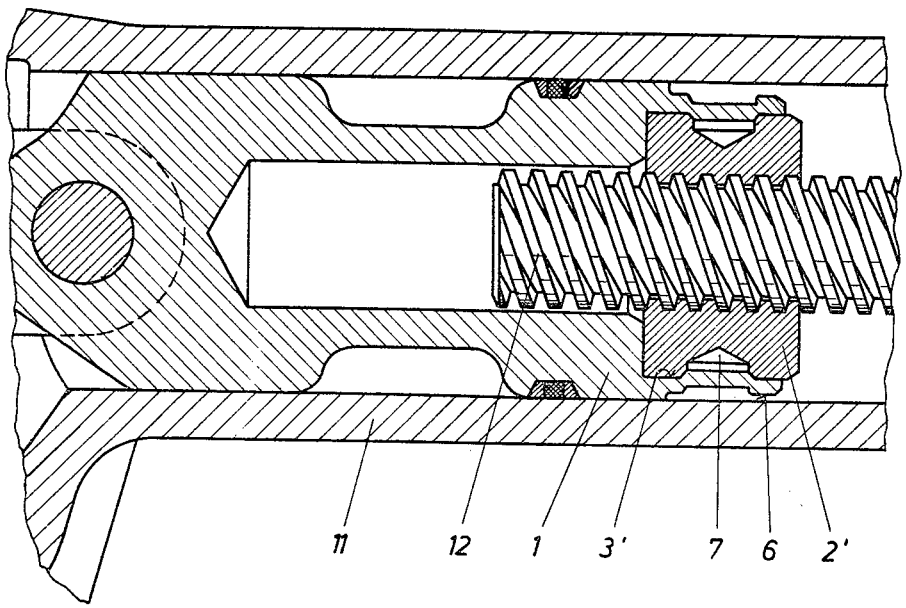
FIG. 1 is a cross section in elevation of steering booster cylinder, piston, steering nut, and threaded end of a steering spindle illustrating one from of the invention.

Referring to the drawing, wherein like reference characters on the several figures indicate the same parts in the several species, a booster piston 1 is disposed in a booster cylinder 11 and will be understood to be slidable therein and subject to pressure, all in a conventional manner for effecting power boost steering. The piston 1 is axially bored as by the bore 3' at one end to receive the steering nut 2' through which passes the usual threaded end 12 of a steering spindle. The nut is provided with a peripheral groove and is secured within the bore 3' by a radially inward deformation of the outer end of the piston. Thus, the terminal portion of the piston is a relatively thin-walled skirt 6, of reduced diameter, the nut being force fitted into the skirt 6 to provide an initial interference connection. The skirt 6 is annularly deformed into the groove in any suitable manner as by a pressing tool, dies, or thermal deformation subsequent to insertion of the nut in the bore 3'. Such deformation is clearly shown on FIG. 1 and will be understood to securely grip the nut and effect a connection which is fully resistant to axial and torsional stresses. It will, of course, be appreciated that instead of a continuous groove, a series of sockets 7, annularly spaced, may be utilized with the adjacent areas of the skirt 6 dimpled into respective sockets, or other indentation means.

Figure 2:
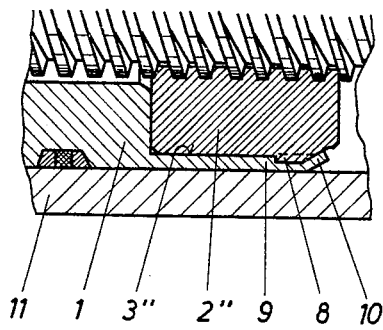
FIG. 2 is a fragmentary cross section showing the essential components of a second form of the invention.

Referring now to FIG. 2, the piston 1 is provided with the axial end opening 3" effected by a relatively thin-walled skirt 9, the nut 2" being thus axially located within the end of the piston, as will be evident from the drawing, and it will be understood to be preferably force fitted thereinto until it bottoms against the radial end area of the bore 3" in the same manner as disclosed in FIG. 1. In order to secure the nut to the piston, the nut is provided with a serrated, knurled, toothed or corrugated peripheral area 8, or is otherwise milled to provide a series of indentations, as indicated by the dotted line on FIG. 2. This annular, milled area will be noted as protruding radially slightly beyond the body radius of the nut. The end of the skirt is deformed radially into such milled area to securely lock the nut and piston together and the extremity 10 then bent inwardly as shown to further strengthen the connection against axial stress. Thus, it will be understood that the area of skirt 9 which is adjacent the milled periphery 8 is locally deformed into the knurled or corrugated area, or conversely, depending upon relative hardnesses of the piston and nut, the ridges of the milled area forced into the material of skirt 9. In any event, a secure, fully keyed co-action between the nut and the skirt is produced around the periphery of the nut or at least at a plurality of angularly spaced locations.

Figure 3:
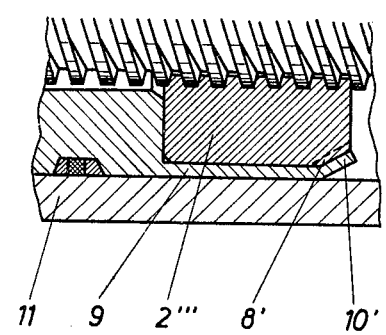
FIG. 3 is a fragmentary cross section showing the essential components of a third form of the invention.

The form of the invention shown in FIG. 3 is somewhat similar to that described for FIG. 2. Thus, the nut 2''' is preferably force fitted into the skirt 9 until it bottoms against the large radial end wall of the piston body. In this instance, however, the milling 8' is provided on a beveled edge adjacent the end of the nut and the end 10' of skirt 9 deformed into such milled area whereby a securely keyed locking connection which is fully resistant to axial and torsional stress is effected.

Figure 4:
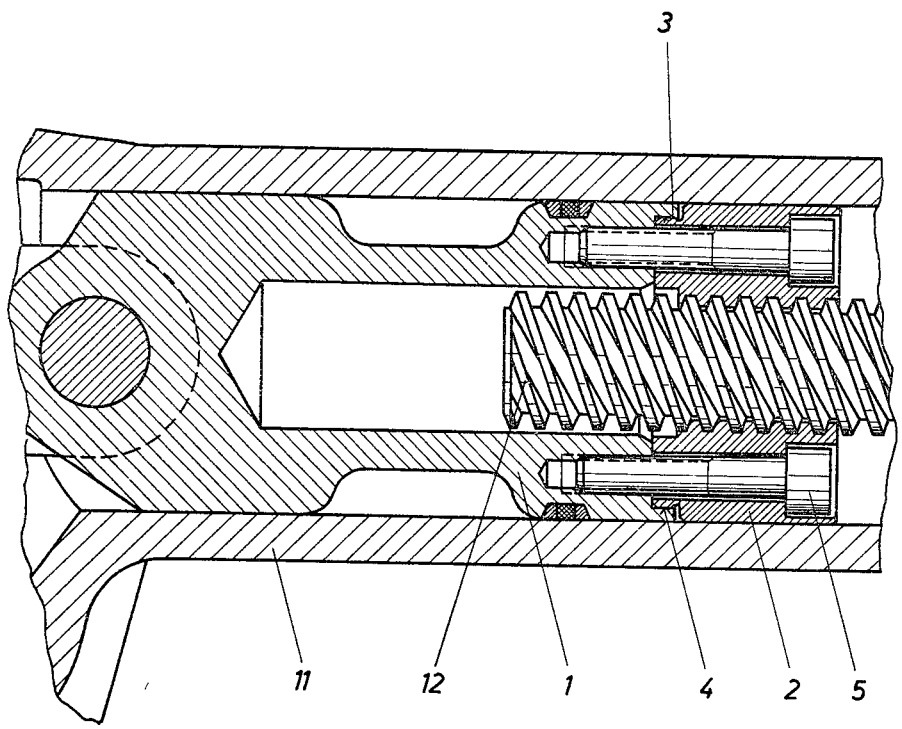
FIG. 4 is a cross section showing the essential components of a fourth form of the invention.

In the form of the invention shown in FIG. 4, the end of the piston is provided with a comparatively short skirt which effects a short bore or socket 4 and the nut 2 is provided with an extending portion 3 of reduced diameter which can be fitted into the bore 4 to axially align the nut with piston 1. The piston is provided with threaded bores as shown to take through-bolts 5 which pass through bores in the nut. When the bolts are screwed in, they press the nut and piston together thereby securing the nut and piston against axial and torsional stress. This particular embodiment provides a very compact structure due to the short length of the telescopic portions of the piston and nut. Also, there are no torsional forces transmitted directly between the nut and the bolts 5, such stress being taken by frictional engagement between the nut and the piston.

From the above description it will be apparent that the invention provides a simple and readily manufactured and assembled combination of steering nut and booster piston which automatically effects proper axial alignment therebetween by virtue of an initial telescopic connection between the nut and piston, preferably force fitted, up to a bottoming engagement therebetween and followed by a locking connection therebetween which may be carried out in various ways, all as illustrated and described.

What is claimed is:

1. In a booster steering system, the combination of a booster piston and a steering nut, said booster piston being provided with an axial end bore, said steering nut having a telescopic, coaxial, interference fit within said end bore and thereby axially aligned with said booster piston and locking means for locking said piston and nut together against radial and axial relative movement comprising a booster piston deformation peripherally gripping said steering nut and disposed at said end bore.

2. In a booster steering system as set forth in claim 1, said booster piston having a radial face terminating said end bore and said steering nut being bottomed against said radial face.

3. In a booster steering system as set forth in claim 1, wherein said locking means comprises a skirt of deformable material effecting said end bore and at least a portion of said skirt being radially deformed against a portion of said steering nut, said skirt being substantially thinner in radial section than said booster piston.

4. In a booster steering system as set forth in claim 1, said locking means also comprising bolt means securing said booster piston and said steering nut and extending longitudinally therebetween.

5. In a booster steering system as set forth in claim 3, said steering nut having indentations to grippingly coact with said deformation.

6. In a booster steering system as set forth in claim 3, said steering nut having a peripheral groove receiving said deformation.

References Cited

UNITED STATES PATENTS

| | | | |
|---|---|---|---|
| 1,029,104 | 6/1912 | Clark | 287—109 X |
| 1,092,464 | 4/1914 | Watson et al. | 287—109 X |
| 2,210,804 | 8/1940 | Eby | 287—109 X |
| 2,929,364 | 3/1960 | Gribler | 92—136 X |
| 3,100,660 | 8/1963 | Kempf | 287—53 |
| 3,279,870 | 10/1966 | Janisewski | 287—53 X |

FOREIGN PATENTS

| | | |
|---|---|---|
| 232,328 | 4/1925 | Great Britain. |
| 358,448 | 9/1922 | Germany. |

DAVID J. WILLIAMOWSKY, Primary Examiner

WAYNE L. SHEDD, Assistant Examiner

U.S. Cl. X.R.

92—136; 287—53